United States Patent
Vijendra et al.

(10) Patent No.: US 9,747,128 B1
(45) Date of Patent: Aug. 29, 2017

(54) WORLDWIDE DISTRIBUTED FILE SYSTEM MODEL

(75) Inventors: Sudhir Vijendra, Cambridge, MA (US); Patricia G. S. Florissi, Briarcliff Manor, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 391 days.

(21) Appl. No.: 13/535,684

(22) Filed: Jun. 28, 2012

Related U.S. Application Data (63) Continuation-in-part of application No. 13/435,009, filed on Mar. 30, 2012.

(60) Provisional application No. 61/578,757, filed on Dec. 21, 2011.

(51) Int. Cl.
    *G06F 17/50*     (2006.01)
    *G06F 9/46*     (2006.01)
    *G06F 9/50*     (2006.01)

(52) U.S. Cl.
    CPC ............ *G06F 9/466* (2013.01); *G06F 9/5072* (2013.01)

(58) Field of Classification Search
    CPC ............. G06F 11/3466; G06F 11/2257; G06F 11/2273; G06F 2201/86; G06F 17/30327; G06F 17/30592; G06F 8/38; G06F 8/45; G06F 9/5072; G06F 11/008
    USPC ............. 703/13, 22; 707/600, 791, 792, 794
    See application file for complete search history.

(56) References Cited

U.S. PATENT DOCUMENTS

| | | | |
|---|---|---|---|
| 6,748,447 B1* | 6/2004 | Basani | H04L 67/1095 709/219 |
| 6,970,924 B1* | 11/2005 | Chu | H04L 41/5067 709/224 |
| 7,756,919 B1* | 7/2010 | Dean et al. | 709/201 |
| 8,364,723 B1* | 1/2013 | Hseush et al. | 707/803 |
| 8,850,528 B2* | 9/2014 | Van Biljon | G06Q 30/04 707/783 |
| 9,626,202 B2* | 4/2017 | Chambers | G06F 9/45504 |
| 2003/0070070 A1* | 4/2003 | Yeager | G06F 9/544 713/157 |
| 2004/0030822 A1* | 2/2004 | Rajan | G06F 3/0605 711/4 |
| 2005/0228856 A1* | 10/2005 | Swildens | G06F 9/50 709/200 |
| 2009/0106348 A1* | 4/2009 | Banerjee | G06F 9/52 709/203 |
| 2009/0276771 A1* | 11/2009 | Nickolov et al. | 717/177 |
| 2010/0309812 A1* | 12/2010 | Galan Marquez et al. | 370/254 |
| 2010/0332531 A1* | 12/2010 | Galande | 707/770 |
| 2011/0307521 A1* | 12/2011 | Slezak et al. | 707/800 |
| 2012/0030356 A1* | 2/2012 | Fletcher | 709/226 |

(Continued)

OTHER PUBLICATIONS

Alan Murphy ("Global Distributed Service in the Cloud with F5 and VMware", FS Networks white paper, 2009).*

(Continued)

*Primary Examiner* — Omar Fernandez Rivas
*Assistant Examiner* — Iftekhar Khan
(74) *Attorney, Agent, or Firm* — Krishnendu Gupta (57) ABSTRACT

Example embodiments of the present invention relate to a method, an apparatus, and a computer program product for providing a worldwide distributed file system model. The method includes providing a layer across at least one file system for presentation as a worldwide distributed file system and presenting the layer across the at least one file system as the worldwide distributed file system.

20 Claims, 4 Drawing Sheets

(56) References Cited

U.S. PATENT DOCUMENTS

| | | | | |
|---|---|---|---|---|
| 2012/0311589 A1* | 12/2012 | Agarwal | ............... | G06F 9/46 |
| | | | | 718/102 |
| 2012/0317155 A1* | 12/2012 | Ogasawara et al. | ......... | 707/812 |
| 2012/0317579 A1* | 12/2012 | Liu | .............. | 718/104 |
| 2013/0007091 A1* | 1/2013 | Rao et al. | .................. | 709/201 |
| 2013/0086355 A1* | 4/2013 | Narang et al. | ................ | 712/30 |
| 2013/0103787 A1* | 4/2013 | Glover | ............ | H04L 67/1002 |
| | | | | 709/217 |
| 2013/0104140 A1* | 4/2013 | Meng et al. | ................ | 718/104 |

OTHER PUBLICATIONS

Lee et al. ("Parallel Data Processing with MapReduce: A Survey",SIGMOD Record, Dec. 2011 (vol. 40, No. 4), pp. 11-20).*
Yuan Luo, Zhenhua Guo, Yiming Sun, Beth Plale, Judy Qiu, Wilfred W. Li; A Hierarchical Framework for Cross-Domain MapReduce Execution; School of Informatics and Computing, Indiana University, Bloomington, IN, 47405; San Diego Supercomputer Center, University of California, San Diego, La Joila, CA. 92093.

\* cited by examiner

WORLDWIDE DISTRIBUTED FILE SYSTEM MODEL

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This Application is a Continuation-in-Part of U.S. patent application Ser. No. 13/435,009 entitled "BIOINFORMATICS CLOUDS AND BIG DATA ARCHITECTURE" filed on Mar. 30, 2012, the contents and teachings of which are incorporated herein by reference in their entirety, which application claims the benefit of U.S. Provisional Patent Application Ser. No. 61/578,757 entitled "BIOINFORMATICS CLOUDS AND BIG DATA ARCHITECTURE" filed on Dec. 21, 2011, the contents and teachings of which are incorporated herein by reference in their entirety.

This application is related to U.S. patent application Ser. No. 13/535,696 entitled "WORLDWIDE DISTRIBUTED ARCHITECTURE MODEL AND MANAGEMENT", Ser. No. 13/535,712 entitled "EXECUTION FRAMEWORK FOR A DISTRIBUTED FILE SYSTEM", Ser. No. 13/535,731 entitled "PARALLEL MODELING AND EXECUTION FRAMEWORK FOR DISTRIBUTED COMPUTATION AND FILE SYSTEM ACCESS", Ser. No. 13/535,814 entitled "WORLDWIDE DISTRIBUTED JOB AND TASKS COMPUTATIONAL MODEL", Ser. No. 13/535,744 entitled "ADDRESSING MECHANISM FOR DATA AT WORLD WIDE SCALE" Ser. No. 13/535,760 entitled "SCALABLE METHOD FOR OPTIMIZING INFORMATION PATHWAY", Ser. No. 13/535,796 entitled "CO-LOCATED CLOUDS, VERTICALLY INTEGRATED CLOUDS, AND FEDERATED CLOUDS", and Ser. No. 13/535,821 entitled "DISTRIBUTED PLATFORM AS A SERVICE", filed on even date herewith, the contents and teachings of which are incorporated herein by reference in their entirety.

TECHNICAL FIELD

This application relates to Big Data.

BACKGROUND

The amount of data in our world has been exploding. Companies capture trillions of bytes of information about their customers, suppliers, and operations, and millions of networked sensors are being embedded in the physical world in devices such as mobile phones and automobiles, sensing, creating, and communicating data. Multimedia and individuals with smartphones and on social network sites will continue to fuel exponential growth. Yet, the impact this growing amount of data will have is unclear.

SUMMARY

Example embodiments of the present invention relate to a method, an apparatus, and a computer program product for providing a worldwide distributed file system model. The method includes providing a layer across at least one file system for presentation as a worldwide distributed file system and presenting the layer across the at least one file system as the worldwide distributed file system.

BRIEF DESCRIPTION OF THE DRAWINGS

The above and further advantages of the present invention may be better under stood by referring to the following description taken into conjunction with the accompanying drawings in which.

DETAILED DESCRIPTION

Generally, the amount of data capture has grown in every area of global economy. Normally, companies are churning out increasing amounts of transactional data, capturing trillions of bytes of information about their customers, suppliers, and operations. Conventionally, millions of networked sensors embedded in the physical world in devices such as mobile phones, smart energy meters, automobiles, and industrial machines create data that is recorded and stored (computed, archived, analyzed . . . ). Usually, as companies and organizations generate a tremendous amount of digital data that are created as a by-product of their activities. Often, enterprises may be collecting data with greater granularity and frequency, capturing every customer transaction, attaching more personal information, and also collecting more information about consumer behavior in many different environments. Usually, this activity increases the need for more storage and analytical capacity.

Typically, social media sites, smartphones, and other consumer devices including PCs and laptops have allowed billions of individuals around the world to contribute to the amount of data available. Normally, consumers communicate, browse, buy, share, and search creating large amounts of consumer data. However, conventional techniques are not able to monitor or analyze this "Big Data." Generally, conventional modeling techniques do not accommodate for or do not model the properties that define Big Data. For example, conventional techniques may not be able to perform analysis on Big Data because of the sheer number and size of transaction that would be necessary to perform the analysis. As well, conventional techniques may consider elements as attributes of the data when, to properly represent the Big Data these "attributes" may need to be considered as properties of the Big Data.

Generally, the Hadoop framework focuses on Massive Parallel Processing (MPP) within the delimiters of a Cluster or data set. Usually, Hadoop assumes that data or Big Data has been transferred to a single cluster and has been evenly distributed across the nodes of the cluster. Typically, Hadoop does not enable analysis of data across multiple clusters. Conventionally, different parts of the Big Data may reside on different clusters potentially spread across different clouds. Usually, a retail enterprise may need to analyze its sales transactions over the last 5 years, but it may store last four years' transactions in a Public Cloud while retaining the last 12 months in its own Private Cloud. Generally, the enterprise does not have the storage, processing capacity or bandwidth, to repatriate the last four years worth of Big Data to its private cloud. In an embodiment, the current disclosure enables management of big data sets where the content may exist across numerous clouds or data storage centers. As used herein, for simplicity, the framework for Massive Parallel Processing (MPP) within the delimiters of a Cluster or data set may be referred to as Hadoop by way of example, however any framework may be used and the current techniques are not limited to use with Hadoop.

Generally, with respect to the data, there may be two architectural frameworks. Conventional architecture design may assume that there are three main types of hardware resources to be managed, servers, enclosing very expensive processors that should not be idle at any moment in time, storage Arrays, enclosing drives of different performance and capacity ranging from Solid State Drive (SSD) to Fiber Channel and SATA, and Storage Area Network (SAN), connecting a set of servers to a set of storage arrays. Generally, this architecture may assumes that most applications are "computing intensive" meaning that there will be high demand for processing power that performs computation on a subset of all the data available for the application, which may be transferred across the SAN to the servers.

Conventionally, a cluster type architecture assumes a flat commodity world, where processing cores and disk drives are cheap and abundant, even though they may and will fail often, applications are computing and data intensive, where computations may need to be done over the entire data set; and in processing Big Data, transfer time becomes the new bottleneck. Traditionally, a Cluster architecture may be based on a set of very simple components and assumes that there are hundreds or thousands of these components together, a node may consist of a set of processing cores attached to a set of disks, a rack may consist of a stack of nodes, and a cluster may consist of a group of racks. Conventionally, within the context of a Cluster, Big Data is typically divided into equal size blocks and the blocks are distributed across the disks in the nodes. Usually, the data in each node may processed by the processing cores in the node providing Data Locality where the data is collocated with the computing node;

Typically, distributed file systems may provide data in a data center to be split between nodes. Generally, a distributed file system may split, scatter, replicate and manage data across the nodes in a data center. Typically, a file system may be a distributed file system when it manages the storage across a network of machines and the files are distributed across several nodes, in the same or different racks or clusters. Conventionally, map reduce may be a computational mechanism to orchestrate the computation by dividing tasks, collecting and re-distributing intermediate results, and managing failures across all nodes in the data center. In certain embodiments, the current techniques may enable data to be split between nodes. In other embodiments, the current techniques may enable computation on data that has been split between nodes.

Conventionally, a distributed file system may consist of a set of equal size file blocks. Typically these blocks may be multiples of a simple multiplier, such as 512 kb. Generally, file blocks may be the unit used to distribute parts of a file across disks in nodes. Usually, as disks in a node and nodes in a rack may fail, the same file block may be stored on multiple nodes across the cluster. Typically, the number of copies may be configured. Usually, the Name Node may decide in which disk each one of the copies of each one of the File Blocks may reside and may keep track of all that information in local tables in its local disks. Conventionally, when a node fails, the Name Node may identify the file blocks that have been affected; may retrieve copies of these file blocks from other healthy nodes; may find new nodes to store another copy of them, may store these other copies; and may update this information in its tables. Typically, when an application needs to read a file, it may connect to the Name Node to get the addresses for the disk blocks where the file blocks are and the application may then read these blocks directly without going through the Name Node anymore.

In some embodiments, "Big Data" may refer to a dataset that has a size, volume, analytical requirements, or structure demands larger than typical software tools may capture, store, manage, and analyze. In certain embodiments, "Big Data" may refer to a dataset that has a combination of attributes, such as size, volume, structure, or analytical requirements, with which typical software tools may not be able to work. In most embodiments, big data is not defined in terms of being larger than a certain number of terabytes rather, as technology advances over time, the size of datasets that qualify as big data may also increase. In certain embodiments, data transfer speed and number of transactions may also be attributes of Big Data.

In further embodiments, the definition of "Big Data" may vary by sector or industry, depending on what kinds of software tools are commonly available and what sizes of datasets are common in a particular industry. Big Data may refer to data from Digital Pathology, data from seismological surveys, data from the financial industry, and other types of data sets that are generally too large, for example in size or number of transactions, to be modeled and analyzed with conventional techniques.

Typically, organizations and business units share IT services, which may result in the creation of Big Data. Generally, the network, apps, and servers are shared and/or dedicated in many instances. Usually, of cloud and Big Data models and analytic platforms provide opportunities for the storage business. However, conventional file sizes vary depending on the verticals, domains and type of data. Conventionally solutions provide a good infrastructure to host files that are large in size, but not for smaller files.

Generally, Big Data is Multi Structured and may be conventionally stored, analyzed and managed each type of information in a number of different ways. In some embodiments, structured data may be stored in Block based, SQL, and RDBMS type databases. In other embodiments, semi-structured data may be stored in XML Data Files, in File Based systems, and in Hadoop Map Reduce. In further embodiments, quasi-structured data may be data containing some inconsistencies in data values and formats, e.g., Web click-stream data. In some embodiments, unstructured data may be text documents that could be subject to analytics over text or numbers such as file based data, Hadoop MapReduce, and HDFS data. In other embodiments, unstructured data may be images and video such as file based data, and data streamlined with technologies such as MapReduce, or Scale Out NAS data. Typically, it may be difficult to process information stored in all different formats, cross-analyze content, or visualize and gain insight into the important information spread all over the different formats.

In some embodiments, Worldwide Hadoop (WWH) or other big data processing methodologies may enable Massive Parallel Processing (MPP) to be executed across multiple clusters, and clouds without requiring one or more Big Data sets to be located at the same location. In certain embodiments, WWH may consist of a layer of orchestration on top of Hadoop or a similar architecture that manages the flow of operations across clusters of nodes. In other embodiments, the clusters maybe separate across metro or worldwide distances. In further embodiments, the current techniques may enable Worldwide Hadoop (WWH) to enable Genome Wide Analysis (GWA) of Genomes that reside on different Genome Banks, one located in NY and another located in MA.

In certain embodiments, Worldwide Hadoop may be applied where big data clouds exist. In certain embodiments, clouds may be extension of the other clouds. In other embodiments, clouds may be an independent cloud. In further embodiments, clouds may be providing an analysis services to other clouds. In some embodiments, the big data clouds may exchange raw data or analyze data for further processing. In certain embodiments, the domain expertise, open data, open science data, analysis etc, may come from different geographic locations and different clouds may host the respective big data. In at least some embodiments, the federation among big data clouds may present an internet infrastructure challenge. In some embodiments, factors like cost and bandwidth limit may affect the big data Hadoop deployment federation. In certain embodiments, the current techniques may model Hadoop environments. In other embodiments, the current techniques may re-define roles of the Hadoop components in the Hadoop clusters. In certain embodiments, Massive Parallel Processing may be enabled across clouds. In some embodiments, WWH concepts apply where there are many big data clouds, and the clouds may need to either exchange raw data or analyze data for further processing. In some embodiments, as used herein, a cluster may be used interchangeably with a data center.

Worldwide Distributed File System Model

In most embodiments a worldwide distributed file system model or modeling structure may be used to present a worldwide distributed file system. In most embodiments, the worldwide distributed file system model may enable representation of one or more file systems as a worldwide distributed file system. In certain embodiments, this model may include file system blocks, files, file systems, domains and worldwide distributed file systems. It should be understood that, the file systems may be any kind of file system, such as Network File System (NFS), OneFS, Hadoop Distributed File System (HDFS), Global Data File System (GDFS) or any other file system being part of the domains/clusters within the world wide distributed file system. Further, it should be understood that the worldwide distributed file system may be set up as a homogeneous file system (i.e., only one type of file system across domains) or a heterogeneous file system (i.e., multiple types of file systems across domains).

In most embodiments, the classes, objects, and representations referenced herein may be an extension of known distributed system models, such as the EMC® (formerly Smarts®) Ionix® Common Information Model (ICIM) by EMC Corporation of Hopkinton, Mass., or similarly defined or pre-existing CIM-based model and adapted for the environmental distributed system, as will be discussed below. This exemplary model is an extension of the Distributed Management Task Force (DMTF)/Storage Management Initiative (SMI) model.

Model-based system representation is discussed in U.S. Pat. No. 5,528,516, entitled "APPARATUS AND METHOD FOR EVENT CORRELATION AND PROBLEM REPORTING;" U.S. Pat. No. 5,661,668, entitled "APPARATUS AND METHOD FOR ANALYZING AND CORRELATING EVENTS IN A SYSTEM USING A CAUSALITY MATRIX;" U.S. Pat. No. 6,249,755, entitled "APPARATUS AND METHOD FOR EVENT CORRELATION AND PROBLEM REPORTING;" U.S. Pat. No. 6,868,367, entitled "APPARATUS AND METHOD FOR EVENT CORRELATION AND PROBLEM REPORTING;" U.S. Pat. No. 7,003,433, entitled "APPARATUS AND METHOD FOR EVENT CORRELATION AND PROBLEM REPORTING;" and U.S. Pat. No. 7,107,185, entitled "APPARATUS AND METHOD FOR EVENT CORRELATION AND PROBLEM REPORTING," the contents and teachings of all of which are hereby incorporated herein by reference in their entirety. An example of a Big Data Set may be found in U.S. patent application Ser. No. 12/977,680, filed Dec. 23, 2010, entitled "INFORMATION AWARE DIFFERENTIAL STRIPING;" the contents and teachings of which are hereby incorporated herein by reference in their entirety. An example of modeling a Big Data Set may be found in U.S. patent application Ser. No. 13/249,330, filed Sep. 30, 2011, entitled "MODELING BIG DATA," the contents and teachings of which are hereby incorporated herein by reference in their entirety. An example of analyzing Big Data Set may be found in U.S. patent application Ser. No. 13/249,335, filed Sep. 30, 2011, entitled "ANALYZING BIG DATA," the contents and teachings of which are hereby incorporated herein by reference in their entirety. Each of the preceding applications and patents is commonly owned by EMC Corporation of Hopkinton, Mass.

In general, the preceding patents and patent applications disclose modeling of distributed systems by defining a plurality of network configuration non-specific representations of types of components (elements or devices) managed in a network and a plurality of network configuration non-specific representations of relations among the types of managed components and problems and symptoms associated with the components and the relationships. The configuration non-specific representations of components and relationships may be correlated with a specific Big Data set for which the associated managed component problems may propagate through the analyzed system and the symptoms associated with the data set may be detected an analyzed. An analysis of the symptoms detected may be performed to determine the root cause of the observed symptoms (i.e., the source of the problem). Other analysis, such as impact, fault detection, fault monitoring, performance, congestion, connectivity, interface failure, in addition to root-cause analysis, may similarly be performed based on the model principles described herein.

Figure 1:
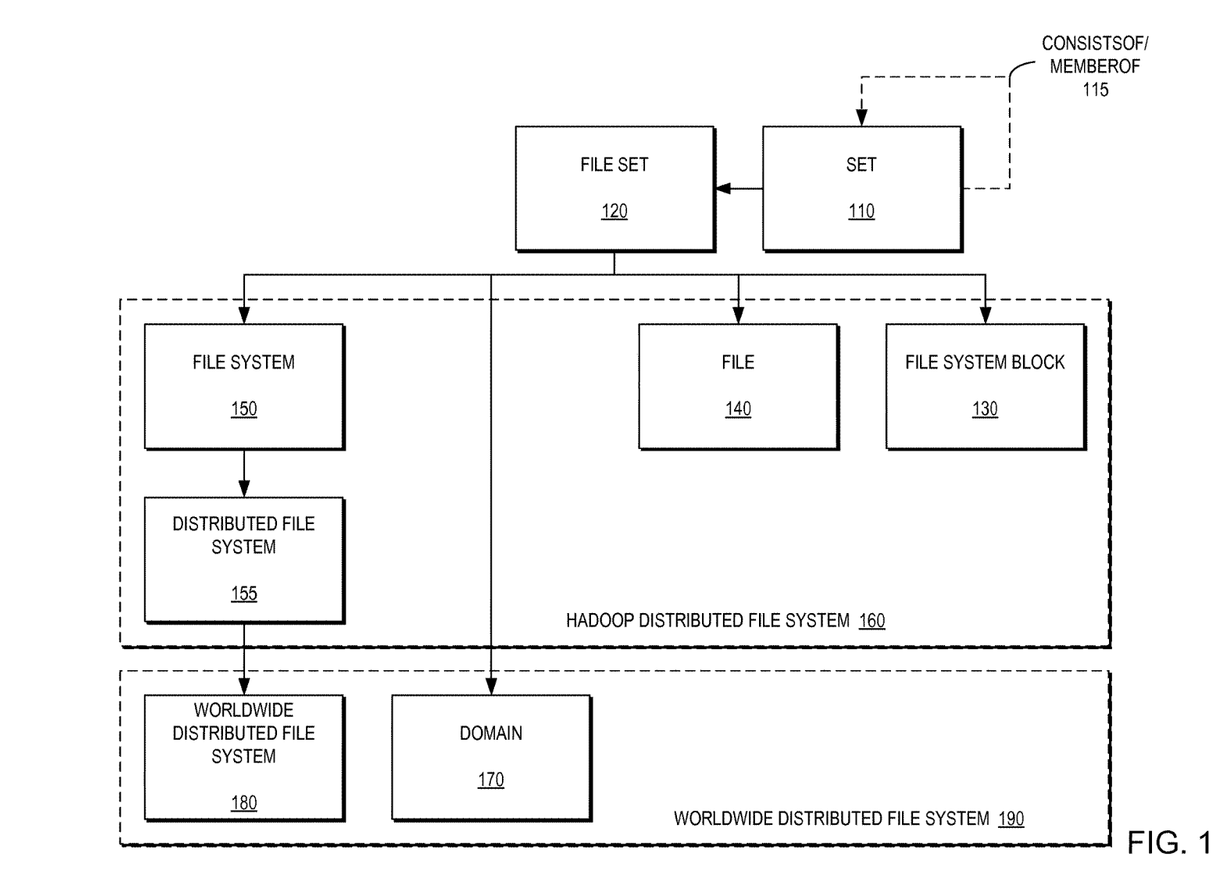
FIG. 1 is a block diagram illustrating a class model of a worldwide distributed file system according to an example embodiment of the present invention.

FIG. 1 is a block diagram illustrating a class model of a worldwide distributed file system according to an example embodiment of the present invention. In the example embodiment of FIG. 1, directional dotted lines (e.g., ConsistsOf/MemberOf 115) may represent relationship from one class or instance to another. In most embodiments, if the dotted line is bi-directional then the inverse relationship needed to traverse the classes may be written next to the relationship name with a '/' sign. In FIG. 1, unidirectional solid line 115 represents the class inheritance. In certain embodiments, the inherited class may be where the arrow in the line ends, and the other class may be the source class. In most embodiments, the inherited class inherits the methods and properties from the source class. In FIG. 1 and the figures that follow, classes are represented as solid-lined rectangular boxes with right-angle corners. Instances of a class are represented as solid-lined rectangular boxes with rounded corners.

As illustrated in FIG. 1, abstract classes defining the root of a distributed file system hierarchy are presented. In certain embodiments, the distributed file system may include a super set 110. The set 110 may be an abstract class representing entities that have the same properties of the mathematical construct set. In other words, the set 110 has the relationship that it may have other sets 110. In certain embodiments, members of the class set 110 may have a ConsistsOf relationship 115 with other members of the class 110. In most embodiments, the inverse relationship of ConsistsOf is MemberOf 115. In some embodiments, the class set 110 may be the root of the WWH worldwide distributed file system model. In at least some embodiments, the class set 110 may define ConsistsOf and MemberOf relationships 115 to itself 110. In further embodiments, the class set 110 abstract class may have many inherited classes. In certain embodiments, the inherited classes may add or override methods, properties and relationships.

Continuing one level deeper in the modeling tree, a subclass of a set 110 is a file set 120, which is an abstract class representing entities that, in addition to exhibiting the properties of the class set 110, describe component properties associated with how the distributed file system represents and manages data. In other words, a file set 120 is a class that collects data. Members of the subclass file set 120 may have a LayeredOver relationship with members of the class ArchitectureSet, indicating that these members of the File Set Class reside (i.e., are hosted) or utilize the related members of the Architecture Class. The LayeredOver relationship is described in greater details in U.S. patent application Ser. No. 13/435,009, filed Mar. 30, 2012, entitled "WORLDWIDE DISTRIBUTED ARCHITECTURE MODEL AND MANAGEMENT," the contents and teachings of which are hereby incorporated herein by reference in their entirety.

FIG. 1 also illustrates abstractions for the Hadoop distributed file system: Class File 140 is a class representing a collection of Storage Blocks that can be addressed and handled as a single entity. Files 140 typically are referred to by a user-defined name and managed by a File System 150. Class File System 150 is a class representing a system comprising a collection of Files 140 and may include attributes indicating the type of the file system (e.g., NFS, OneFS, HDFS, GDFS) and file summary information (e.g., number of files, file sizes, names, date of creation, last update). A File System 150 manages Storage Blocks to provide the abstraction of a File 140 to an end user. Class File System Block 130 is a class representing pieces of a File 140, as managed by the File System 150. A File System Block 130 is typically a multiple of a Storage Block. Class Distributed File System 155 is a class representing a File System 150 that manages Files 140 whose Storage Blocks may be spread across a network of nodes, racks or clusters. Nodes, racks and clusters are described in greater detail in the aforementioned U.S. patent application Ser. No. 13/435, 009 entitled "WORLDWIDE DISTRIBUTED ARCHITECTURE MODEL AND MANAGEMENT" filed on Mar. 30, 2012 and incorporated by reference herein in its entirety.

FIG. 1 also illustrates further abstractions of a worldwide distributed file system. For example, the worldwide distributed file system may include a class Domain 170 representing a collection of Files 140 that can be addressed and handled as a single entity. In other words, a collection of Files 140 can constitute a Domain 170, which may be spread across a File System 150. The Worldwide Distributed File System 155 is a type of File System 150. Thus, in addition to Files 140 being spread across machines, as described above, Files 140 in a Domain 170 may be spread across File Systems 150, thereby providing a non-disruptive, non-intrusive layer providing advantages over traditional cross-file-system access that may be disruptive to security, upgrades, changes in file system applications, and privacy. Domains 170 typically are referred to by a user-defined name and managed by a File System 150 that can handle the concept of a Domain 170. Each File 140 in the Domain 170 may be managed by a File System 150 which can be the same one as the File System 150 managing the Domain 170 or not. The Files 140 in a Domain 170 may be located across machines, in which case they need to be managed individually by a Distributed File System 155 (i.e., a File System 150 that can manage files across machines). The Distributed File System 155 may be the same as the File System 150 managing the Domain 170, as long as the File System 150 is a Distributed File System 155 as well, as specified in the class hierarchy of FIG. 1.

FIG. 1 also illustrates a further abstraction of the class hierarchy to include a Worldwide Distributed File System 180. The Worldwide Distributed File System 180 is a class representing a File System 150 that manages Domains 170 whose Files 140 are managed by a Distributed File System 155 or a File System 155. In the Worldwide Distributed File System 180 class, a Domain 170 is a non-exclusive collection of Files 140. In other words, the fact that a File 140 is part of a first Domain 170 does not prevent it from participating in one or more other Domains 170. It should be understood that the term Worldwide may mean that the Worldwide Distributed File System 180 is distributed across administrative boundaries.

Figure 2:
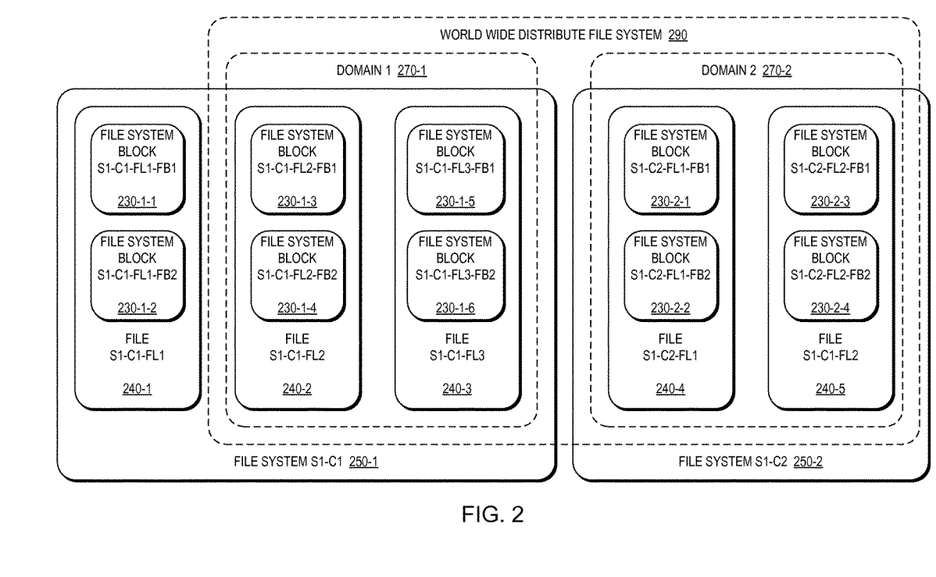
FIG. 2 is a block diagram illustrating a worldwide distributed file system, including domains, file systems, and files according to an example embodiment of the present invention.

FIG. 2 is a block diagram illustrating an alternative representation for the Hadoop distributed file system. As illustrated in FIG. 2, there are two file systems (e.g., instances of file system class 150): file system S1-C1 250-1 and file system S1-C2 250-2. File system S1-C1 250-1 includes three files (e.g., instances of file class 140): file S1-C1-FL1 240-1, file S1-C1-FL2 240-2 and file S1-C1-FL3 240-3. File system S1-C2 250-2 includes two files: file S1-C2-FL1 240-4 and file S1-C2-FL2 240-5. As illustrated in FIG. 2, each file, for example, comprises two File System Blocks (e.g., instance of file system block class 130), although it should be understood that, in other embodiments, the number of File System Blocks comprising a file may be different.

For example, File S1-C1-FL1 240-1 comprises File System Block S1-C1-FL1-FB1 230-1-1 and File System Block S1-C1-FL1-FB2 230-1-2; File S1-C1-FL2 240-2 comprises File System Block S1-C1-FL2-FB1 230-1-3 and File System Block S1-C1-FL2-FB2 230-1-4; File S1-C1-FL3 240-3 comprises File System Block S1-C1-FL3-FB1 230-1-5 and File System Block S1-C1-FL3-FB2 230-1-6; File S1-C2-FL1 240-4 comprises File System Block S1-C2-FL1-FB1 230-2-1 and File System Block S1-C2-FL1-FB2 230-2-2; and File S1-C2-FL2 240-5 comprises File System Block S1-C2-FL2-FB1 230-2-3 and File System Block S1-C2-FL2-FB2 230-2-4. As illustrated in FIG. 2, File S1-C1-FL2 240-2 and File S1-C1-FL3 240-3 from File System S1-C1 250-1 are included in Domain 1 270-1 and File S1-C2-FL1 240-4 and File S1-C2-FL2 240-5 are included in Domain 2

270-2. Domain 1 270-1 and Domain 2 270-2 then are included in the Worldwide Distributed File System 290.

Figure 3:
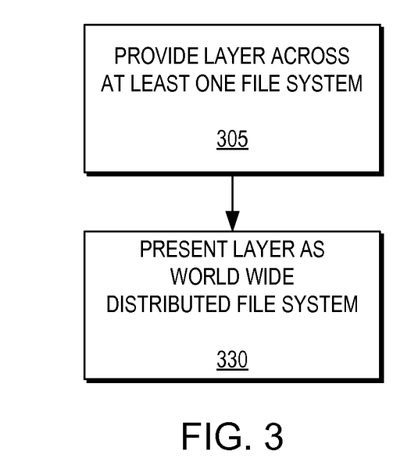
FIGS. 3-5 are flow diagrams illustrating example methods according to example embodiments of the present invention.
Figure 4:
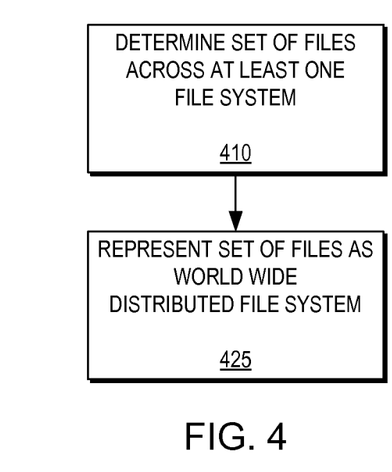
Figure 5:
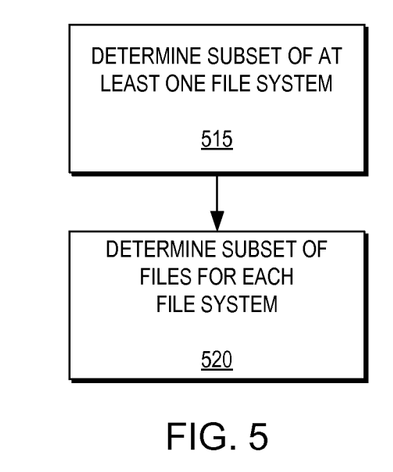

FIGS. 3-5 are flow diagrams illustrating example methods according to example embodiments of the present invention.

As illustrated in FIG. 3, which is a flow diagram illustrating an example method for providing a worldwide distributed file system model, a layer may be provided across at least one file system (e.g., File System S1-C1 250-1 and File System S1-C2 250-2 of FIG. 2) for presentation as a worldwide distributed file system (e.g., Worldwide Distributed File System 290 of FIG. 2) (305). The layer then may be presented as the worldwide distributed file system (330).

As illustrated in FIG. 4, which is a flow diagram illustrating an example method for providing a layer across at least one file system for presentation as a worldwide distributed file system, a set of files across the at least one file system (e.g., File S1-C1-FL2 240-2, File S1-C1-FL3 240-3, File S1-C2-FL1 240-4 and File S1-C2-FL2 240-5 of FIG. 2) may be determined for representation as the worldwide distributed file system (410). Further, to provide the layer, the set of files across the at least one file system may be represented as the worldwide distributed file system (425). In certain embodiments, the set of files for representation as the worldwide distributed file system may be determined across at least one domain. Thus, in other embodiments, the set of files across the at least one domain may be represented as the worldwide distributed file system and presented as the worldwide distributed file system.

As illustrated in FIG. 5, which is a flow diagram illustrating an example method for determining a set of files across at least one file system for representation as the worldwide distributed file system, a subset of the at least one file system (e.g., File System S1-C1 250-1 and File System S1-C2 250-2) including files for representation as the worldwide distributed file system may be determined (515). It should be understood that, although the subset of the at least one file system illustrated in FIG. 2 is the same as the set, the subset of the at least one file system may include a number of file systems less than or equal to the number of file systems in the at least one file system. For each file system of the subset of the at least one file system, a subset of files (e.g., File S1-C1-FL2 240-2 and File S1-C1-FL3 240-3 in File System S1-C1 250-1 and File S1-C2-FL1 240-4 and File S1-C2-FL2 240-5 in File System S1-C2 250-2) included in each file system for representation as the set of files in the worldwide distributed file system may be determined (520). It should be understood that, as illustrated in FIG. 2, the number of files in the subset of files included in a file system may be less than or equal to the number of files in the file system. In certain embodiments, the subset of files included in each file system of the subset of the at least one file system may be presented at the worldwide distributed file system. Thus, presenting the subset of files included in each file system of the subset of the at least one file system as the worldwide distributed file system enables the worldwide distributed file system to cross administrative boundaries between the at least one file system.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 6:
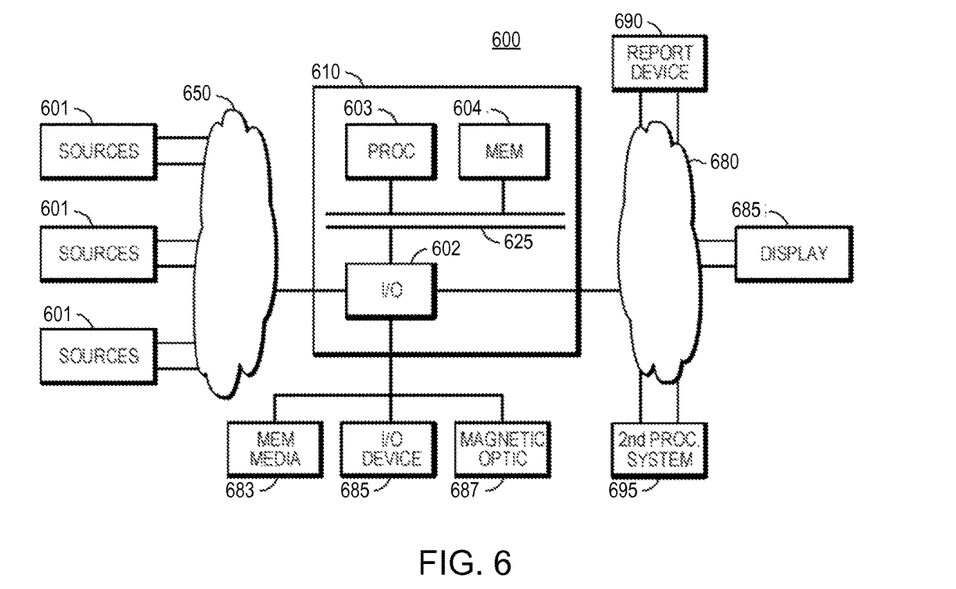
FIG. 6 is a block diagram illustrating an apparatus that may utilize the techniques described herein according to an example embodiment of the present invention.

FIG. 6 is a block diagram illustrating an apparatus, such as a computer 610 in a network 600, that may utilize the techniques described herein according to an example embodiment of the present invention. The computer 610 may include one or more I/O ports 602, a processor 603, and memory 604, all of which may be connected by an interconnect 625, such as a bus. The I/O port 602 may provide connectivity to memory media 683, I/O devices 685, and drives 687, such as magnetic or optical drives. When the program code is loaded into memory 604 and executed by the computer 610, the machine becomes an apparatus for practicing the invention. When implemented on one or more general-purpose processors 603, the program code combines with such a processor to provide a unique apparatus that operates analogously to specific logic circuits. As such, a general purpose digital machine can be transformed into a special purpose digital machine.

Figure 7:
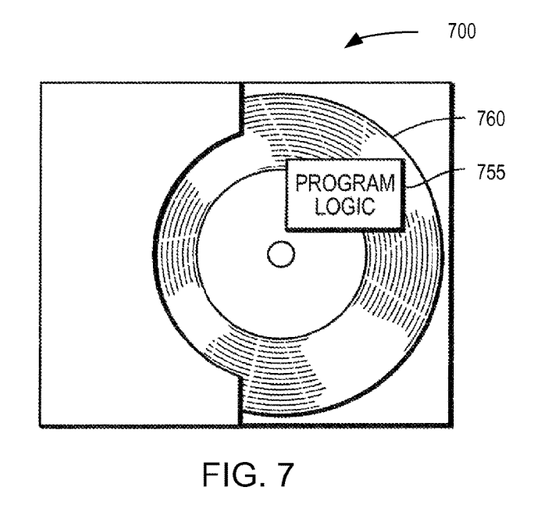
FIG. 7 is a block diagram illustrating a method embodied on a computer readable storage medium that may utilize the techniques described herein according to an example embodiment of the present invention.

FIG. 7 is a block diagram illustrating a method embodied on a computer readable storage medium 760 that may utilize the techniques described herein according to an example embodiment of the present invention. FIG. 7 shows Program Logic 755 embodied on a computer-readable medium 760 as shown, and wherein the Logic is encoded in computer-executable code configured for carrying out the methods of this invention and thereby forming a Computer Program Product 700.

The logic for carrying out the method may be embodied as part of the aforementioned system, which is useful for carrying out a method described with reference to embodiments shown in, for example, FIGS. 1-5. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:
    defining a distributed file system model comprising:
        a plurality of file class instances each representing a collection of storage blocks;
        a plurality of file system class instances each comprising one or more of the plurality of file class instances and an attribute indicating a type of file system, wherein at least two of the plurality of file system class instances indicate different types of file systems; and
        a plurality of domains class instances each associated with one or more of the plurality of file class instances, wherein at least one of the domain class instances is associated with file class instances within two different ones of the file system class instances;

providing, based on the distributed file system model, a layer across a plurality of file systems in respective domains for presentation to a worldwide distributed file system client as a worldwide distributed file system in a parallel processing network having a plurality of nodes grouped into respective clusters each having a cluster distributed file system storing a respective cluster data set; and presenting the layer across the plurality of file systems in respective domains as the worldwide distributed file system to the worldwide distributed file system client to perform parallel processing across administrative boundaries among the domains between the cluster data sets stored on the cluster distributed file systems of each respective cluster of nodes.

2. The method of claim 1 wherein providing a layer across at least one file system stored on at least one node for presentation to a worldwide distributed file system client as a worldwide distributed file system in a parallel processing network having a plurality of nodes grouped into respective clusters each having a cluster distributed file system storing a respective cluster data set comprises:

determining a set of files across the at least one file system for representation to the worldwide distributed file system client as the worldwide distributed file system; and representing the set of files across the at least one file system as the worldwide distributed file system.

3. The method of claim 2
wherein determining a set of files across the at least one file system stored on at least one node for representation to a worldwide distributed file system client as the worldwide distributed file system comprises determining the set of files across at least one domain for representation as the worldwide distributed file system; and wherein representing the set of files across the at least one file system as the worldwide distributed file system comprises representing the set of files across the at least one domain as the worldwide distributed file system.

4. The method of claim 3 wherein presenting the layer across the at least one file system as the worldwide distributed file system to the worldwide distributed file system client to perform parallel processing across administrative boundaries between the cluster data sets stored on the cluster distributed file systems of each respective cluster of nodes comprises presenting the set of files across the at least one domain as the worldwide distributed file system to the worldwide distributed file system client.

5. The method of claim 2 wherein determining a set of files across the at least one file system stored on at least one node for representation to a worldwide distributed file system client as the worldwide distributed file system comprises:

determining a subset of the at least one file system including files for representation as the worldwide distributed file system; and for each file system of the subset of the at least one file system, determining a subset of files included in each file system for representation as the set of files in the worldwide distributed file system.

6. The method of claim 5 wherein presenting the layer across the at least one file system as the worldwide distributed file system to the worldwide distributed file system client to perform parallel processing across administrative boundaries between the cluster data sets stored on the cluster distributed file systems of each respective cluster of nodes comprises presenting the subset of files included in each file system of the subset of the at least one file system as the worldwide distributed file system.

7. The method of claim 6 wherein presenting the subset of files included in each file system of the subset of the at least one file system as the worldwide distributed file system enables the worldwide distributed file system to cross administrative boundaries between the at least one file system.

8. A system comprising:
one or more processors; and
memory storing computer program code that, when executed the one or more processors, causes the system to perform the operation of:
defining a distributed file system model comprising:
a plurality of file class instances each representing a collection of storage blocks;
a plurality of file system class instances each comprising one or more of the plurality of file class instances and an attribute indicating a type of file system, wherein at least two of the plurality of file system class instances indicate different types of file systems; and
a plurality of domains class instances each associated with one or more of the plurality of file class instances, wherein at least one of the domain class instances is associated with file class instances within two different ones of the file system class instances;

providing, based on the distributed file system model, a layer across a plurality of file systems in respective domains for presentation to a worldwide distributed file system client as a worldwide distributed file system in a parallel processing network having a plurality of nodes grouped into respective clusters each having a cluster distributed file system storing a respective cluster data set; and presenting the layer across the plurality of file systems in respective domains as the worldwide distributed file system to the worldwide distributed file system client to perform parallel processing across administrative boundaries among the domains between the cluster data sets stored on the cluster distributed file systems of each respective cluster of nodes.

9. The system of claim 8 wherein providing a layer across at least one file system stored on at least one node for presentation to a worldwide distributed file system client as a worldwide distributed file system in a parallel processing network having a plurality of nodes grouped into respective clusters each having a cluster distributed file system storing a respective cluster data comprises:

determining a set of files across the at least one file system stored on at least one node for representation to the worldwide distributed file system client as the worldwide distributed file system; and representing the set of files across the at least one file system as the worldwide distributed file system.

10. The system of claim 9
wherein determining a set of files across the at least one file system stored on at least one node for representation to the worldwide distributed file system client as the worldwide distributed file system comprises determining the set of files across at least one domain for representation as the worldwide distributed file system; and wherein representing the set of files across the at least one file system as the worldwide distributed file system comprises representing the set of files across the at least one domain as the worldwide distributed file system.

11. The system of claim 10 wherein presenting the layer across the at least one file system as the worldwide distributed file system to the worldwide distributed file system client to perform parallel processing across administrative boundaries between the cluster data sets stored on the cluster distributed file systems of each respective cluster of nodes comprises presenting the set of files across the at least one domain as the worldwide distributed file system to the worldwide distributed file system client.

12. The system of claim 9 wherein determining a set of files across the at least one file system stored on at least one node for representation to the worldwide distributed file system client as the worldwide distributed file system comprises:
- determining a subset of the at least one file system including files for representation as the worldwide distributed file system; and
- for each file system of the subset of the at least one file system, determining a subset of files included in each file system for representation as the set of files in the worldwide distributed file system.

13. The system of claim 12 wherein presenting the layer across the at least one file system as the worldwide distributed file system to the worldwide distributed file system client to perform parallel processing across administrative boundaries between the cluster data sets stored on the cluster distributed file systems of each respective cluster of nodes comprises presenting the subset of files included in each file system of the subset of the at least one file system as the worldwide distributed file system.

14. The system of claim 13 wherein presenting the subset of files included in each file system of the subset of the at least one file system as the worldwide distributed file system enables the worldwide distributed file system to cross administrative boundaries between the at least one file system.

15. A computer program product having a non-transitory computer readable storage medium with instructions encoded thereon that, when executed by a processor of a computer, causes the computer to present a worldwide distributed file system, the computer program product comprising:
- defining a distributed file system model comprising:
  - a plurality of file class instances each representing a collection of storage blocks;
  - a plurality of file system class instances each comprising one or more of the plurality of file class instances and an attribute indicating a type of file system, wherein at least two of the plurality of file system class instances indicate different types of file systems; and
  - a plurality of domains class instances each associated with one or more of the plurality of file class instances, wherein at least one of the domain class instances is associated with file class instances within two different ones of the file system class instances;
- computer program code for providing, distributed file system model, a layer across a plurality of file systems in respective domains for presentation to a worldwide distributed file system client as a worldwide distributed file system in a parallel processing network having a plurality of nodes grouped into respective clusters each having a cluster distributed file system storing a respective cluster data set; and
- computer program code for presenting the layer across the plurality of file systems in respective domains as the worldwide distributed file system to the worldwide distributed file system client to perform parallel processing across administrative boundaries between the cluster data sets stored on the cluster distributed file systems of each respective cluster of nodes.

16. The computer program product of claim 15 wherein computer program code for providing a layer across at least one file system stored on at least one node for presentation to a worldwide distributed file system client as a worldwide distributed file system in a parallel processing network having a plurality of nodes grouped into respective clusters each having a cluster distributed file system storing a respective cluster data set comprises:
- computer program code for determining a set of files across the at least one file system stored on at least one node for representation to the worldwide distributed file system client as the worldwide distributed file system; and
- computer program code for representing the set of files across the at least one file system as the worldwide distributed file system.

17. The computer program product of claim 16
wherein computer program code for determining a set of files across the at least one file system stored on at least one node for representation to the worldwide distributed file system client as the worldwide distributed file system comprises computer program code for determining the set of files across at least one domain for representation as the worldwide distributed file system; and
wherein computer program code for representing the set of files across the at least one file system as the worldwide distributed file system comprises computer program code for representing the set of files across the at least one domain as the worldwide distributed file system.

18. The computer program product of claim 17 wherein computer program code for presenting the layer across the at least one file system as the worldwide distributed file system to the worldwide distributed file system client to perform parallel processing across administrative boundaries between the cluster data sets stored on the cluster distributed file systems of each respective cluster of nodes comprises computer program code for presenting the set of files across the at least one domain as the worldwide distributed file system to the worldwide distributed file system client.

19. The computer program product of claim 18 wherein computer program code for determining a set of files across the at least one file system stored on at least one node for representation to the worldwide distributed file system client as the worldwide distributed file system comprises:
- computer program code for determining a subset of the at least one file system including files for representation as the worldwide distributed file system; and
- computer program code for, for each file system of the subset of the at least one file system, determining a subset of files included in each file system for representation as the set of files in the worldwide distributed file system.

20. The computer program product of claim 19 wherein computer program code for presenting the layer across the at least one file system as the worldwide distributed file system to the worldwide distributed file system client to perform parallel processing across administrative boundaries between the cluster data sets stored on the cluster distributed file systems of each respective cluster of nodes comprises computer program code for presenting the subset of files included in each file system of the subset of the at least one file system as the worldwide distributed file system.

* * * * *